US005940362A

United States Patent [19]

Plonsky et al.

[11] Patent Number: 5,940,362

[45] Date of Patent: Aug. 17, 1999

[54] DISC DEVICE HAVING A MAGNETIC LAYER OVERWEIGHING THE INFORMATION SIGNAL PATTERN FOR ELECTRONIC ARTICLE SURVEILLANCE

[75] Inventors: Christopher B. Plonsky, Boca Raton; Wing Ho, Boynton Beach, both of Fla.

[73] Assignee: Sensormatic Electronics Corporation, Boca Raton, Fla.

[21] Appl. No.: 08/699,494

[22] Filed: Aug. 19, 1996

[51] Int. Cl.⁶ .................................................. G11B 7/24

[52] U.S. Cl. .................................................. 369/273

[58] Field of Search .............................. 369/273, 289, 369/290, 292; 360/135, 137; 340/572

[56] References Cited

U.S. PATENT DOCUMENTS

| | | | |
|---|---|---|---|
| 3,905,040 | 9/1975 | Otala | 360/59 |
| 4,729,940 | 3/1988 | Nee et al. | 430/323 |
| 4,808,291 | 2/1989 | Denton et al. | 204/298 |
| 4,870,524 | 9/1989 | Coe | 360/135 |
| 4,929,928 | 5/1990 | Hultåker | 340/572 |
| 4,931,313 | 6/1990 | Arakawa et al. | 427/164 |
| 4,967,184 | 10/1990 | Regelsberger | 340/572 |
| 5,012,380 | 4/1991 | Harissis et al. | 360/135 |
| 5,031,162 | 7/1991 | Morimoto et al. | 369/13 |
| 5,083,112 | 1/1992 | Piotrowski et al. | 340/572 |
| 5,135,376 | 8/1992 | Watanabe et al. | 425/110 |
| 5,181,020 | 1/1993 | Furukawa et al. | 340/551 |
| 5,347,508 | 9/1994 | Montbriand et al. | 369/273 |
| 5,409,756 | 4/1995 | Ikeda et al. | 428/64 |
| 5,499,015 | 3/1996 | Winkler et al. | 340/551 |

*Primary Examiner*—William R. Korzuch
*Attorney, Agent, or Firm*—Robin, Blecker & Daley

[57] ABSTRACT

A disc device includes a disc substrate having an information signal pattern formed on a surface thereof and a magnetic material layer formed on the information signal pattern which permits for detection of the device by an electronic article surveillance detection system.

5 Claims, 4 Drawing Sheets

DISC DEVICE HAVING A MAGNETIC LAYER OVERWEIGHING THE INFORMATION SIGNAL PATTERN FOR ELECTRONIC ARTICLE SURVEILLANCE

FIELD OF THE INVENTION

This invention relates generally to a disc-like device having electronic article surveillance ("EAS") material, and pertains more particularly to a disc-like device having a magnetic material layer detectable by an EAS detection system.

BACKGROUND OF THE INVENTION

It is well known to provide EAS systems in retail establishments to prevent or deter theft of goods. In a typical system, markers, which are secured to goods, are designed to interact with an electromagnetic or magnetic field placed at a store exit. If the marker is brought into the field or "interrogation" zone, the presence of the marker is detected by the EAS system and an alarm is activated. Some markers of this type are intended to be removed at the checkout counter upon payment for the goods. Other types of markers are deactivated upon checkout by a deactivation device which changes an electromagnetic or magnetic characteristic of the marker so that the marker will no longer be detectable at the interrogation zone.

One type of magnetic EAS system is referred to as a harmonic system because it is based on the principle that a magnetic material passing through an electromagnetic field having a selected frequency disturbs the field and produces harmonic perturbations of the selected frequency. The detection system is tuned to recognize certain harmonic frequencies, and, if present, causes an alarm. The harmonic frequencies generated are a function of the degree of nonlinearity of the hysteresis loop of the magnetic material. Such EAS systems have proven to be very effective and are in widespread use.

When using this type of system, it has been customary for employees of a retail establishment to attach the markers to the goods at the establishment. Generally, employees of a store attach markers to goods by means of a pressure sensitive adhesive layer provided on the marker, or, when the marker is intended to be removable, by a mechanical clamping device.

It has been proposed, however, that manufacturers attach or incorporate the markers in their goods before shipment to stores. This practice has been referred to as "source tagging" which means that an EAS marker or "tag" is applied to goods at the "source" or place of manufacture of the goods.

This practice has been adopted to help prevent theft of disc-like devices, such as compact discs ("CDs"). One example of a surveillance device incorporated in a CD is disclosed in German Patent No. 42 42 992 A1 ("Cosnard"). The Cosnard patent discloses EAS magnetic strips or security foil embedded in the plastic portion surrounding the aperture of the CD. Another example is disclosed in U.S. Pat. No. 5,347,508 ("Montbriand et al.") which discloses an annular EAS magnetic marker concentrically oriented and positioned in an annular groove located around the aperture of the CD.

This placement of EAS strips, foil or markers in a CD helps to alleviate attaching markers to CDs at the retail establishment, but may result, however, in hindering the functioning of the CD, the strip or marker or the CD drive or player. In addition, if the strip or marker is not precisely embedded in the CD, a misplacement can cause interference with the functioning of the CD drive or player. Further, the aluminum coating of the CD can cause interference with the output signal level of the EAS strip or marker thus reducing its signal output which may prevent detection of the strip or marker by surveillance.

It is, therefore, an object of the present invention to provide a disc-like device having a magnetic material layer which provides detection by an EAS detection system.

It is an additional object of the present invention to provide a disc-like device having a magnetic material layer which is combineable or integrated with the disc-like device.

It is a further object of the present invention to provide a disc-like device having a magnetic material layer which is not noticeable or removable from the device.

It is another object of the present invention to provide a disc-like device having a magnetic material layer which can be incorporated in the device at the place of manufacture.

SUMMARY OF THE INVENTION

In accordance with the principles of the present invention, the above and other objectives are realized in a disc-like device comprising a disc-like substrate of a light-transmissive material having an information signal pattern formed on a surface thereof and a magnetic material layer formed on the information signal pattern of the substrate.

In a modified form of the device of the invention, a reflective layer is formed on the information signal pattern of the disc-like substrate and a magnetic material layer is formed on the reflective layer.

In a further modification of the device of the invention, a semi-hard material layer is deposited on the magnetic material layer which allows for the magnetic material layer on the device to be deactivatable as well as reactivatable. This then permits the device to either be non-detectable or detectable in an EAS detection system.

In a further modification of the device of the invention, the disc-like device comprises two disc-like substrates with a magnetic material layer contained therebetween.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

FIGS. 1–4 show a disc-like device 10 for use in an EAS detection system in accordance with the principles of present invention. In the present illustrative case, it is assumed that the disc-like device 10 is a compact disc or "CD", which is a laser-read or optically read data storing device on which coded information, audio, video or textual information in digital form can be stored.

Figure 1:
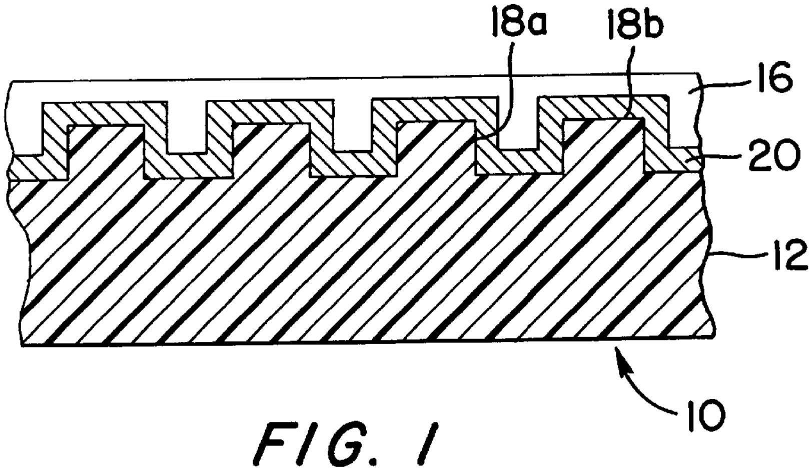
FIG. 1 shows a fragmentary cross-sectional view of a disc-like device in accordance with the principles of the present invention.

As shown in FIG. 1, the disc-like device 10 comprises a disc-like substrate 12 of a light-transmissive material or light transmissive synthetic resin such as polycarbonate (PC), polymethyl methacrylate resin (PMMA), etc. The substrate 12 is injection molded and has an information signal pattern which has been formed as a pattern of pits 18*a* and lands 18*b* on a surface thereof. A magnetic material layer 20 is deposited on the information signal pattern of the substrate 12, by way of evaporation, sputtering, etc. The layer 20 is formed over the surface of the pits 18*a* and lands 18*b* so as to cover the signal pattern on the substrate 12 and has reflective properties.

The layer 20, as illustrated in FIG. 1, in general, is within a range of 1000 Å to 5000 Å but can also be up to a thickness of 10,000 Å. The thickness of the layer 20 is dependent upon having enough volume of magnetic material so that a signal therefrom can be provided and detected by an EAS detection system.

A protective layer 16 may be formed over the magnetic material layer 20 by a spin coating process to protect the surface of the disc-like device 10. In general, the protective layer 16 has a thickness of several microns and is formed of transparent resin such as ultraviolet ray curing resin or lacquer.

The magnetic material layer 20 of the disc-like device 10 of FIG. 1 permits detection of the device 10 in an EAS detection system in the following manner: The magnetic layer 20, when subjected to an alternating magnetic field which exceeds a particular threshold value, generates a unique harmonic signal. Thus if unauthorized removal of the device 10 is attempted, the EAS detection system can detect the unique harmonic signal of the layer 20 and can then generate an alarm.

With the magnetic material layer 20 incorporated in the device 10 at its place of manufacture, this incorporation helps to decrease the number of steps required to provide EAS protection for the device. In addition, the device 10 can then be immediately displayed in a retail establishment. Further, with the layer 20 formed on the surface of the device 10, as illustrated in FIG. 1, EAS surveillance of the device 10 is now possible without detection of EAS means by a customer, employee, etc. This prevents both customers and employees from knowing how the device 10 is protected and further hinders theft.

Figure 2:
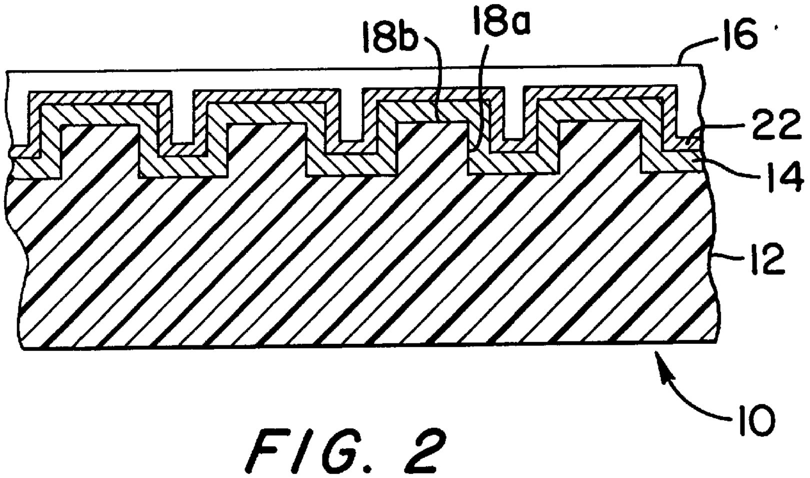
FIG. 2 shows a fragmentary cross-sectional view of a modified embodiment of the disc-like device of the present invention.

In a modified form of the device 10, as best shown in FIG. 2, a reflective layer 14 is deposited on the information signal pattern of the substrate 12, by way of evaporation, sputtering, etc., and is formed over the surface of the pits 18*a* and lands 18*b* so as to cover the signal pattern on the disc-like substrate 12.

The reflective layer 14, for example, can be made of a metallic material, such as an alloy of aluminum or silver and can have a thickness in the range of 600 Å to 1500 Å.

A magnetic material layer 22 is then deposited on the reflective layer 14 on the substrate 12. A protective layer 16 is then formed over the magnetic material layer 22.

Figure 3:
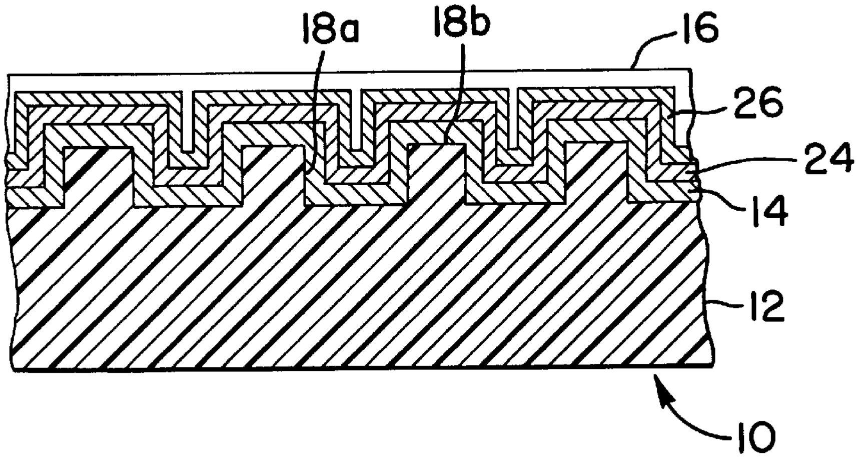
FIG. 3 shows a fragmentary cross-sectional view of a further modified embodiment of the disc-like device of the present invention.

FIG. 3 illustrates a further modification of the device 10 of the invention. In this modification, the device 10 comprises a disc-like substrate 12, a reflective layer 14, a magnetic material layer 24, a semi-hard material layer 26 and a protective layer 16. The magnetic material layer 24 with the semi-hard material layer 26 deposited thereon allows for the device 10 to be detectable and non-detectable by an EAS detection system.

In order for the device 10 as shown in FIG. 3 to be either detectable or non-detectable by an EAS detection system, the magnetic material layer 24 must be in either an activated or deactivated state.

To activate the layer 24, an AC degaussing field is applied to demagnetize the semi-hard material layer 26. Such demagnetization enables the magnetic layer 24 to generate a unique harmonic signal. Thus when the layer 24 is subjected to an alternating magnetic field in the EAS detection area, the EAS detection system will then detect the presence of the device 10.

For the device 10 to be non-detectable by an EAS detection system, the magnetic material layer 24 must be deactivated. To deactivate the layer 24, the semi-hard material layer 26 is subjected to a pulsed or DC magnetizing field. Accordingly, if a pulsed or DC field of an initial level of about 200 Oe or above is applied to the device 10, the layer 26 is sufficiently magnetized so that significantly reduced or no harmonic signals from the layer 24 are detectable. Upon removing the DC field, the layer 26 remains magnetized thereby rendering the device 10 nondetectable.

To reactivate the device 10, the semi-hard material layer 26 is again demagnetized. This is accomplished by applying an AC degaussing field to the layer 26. Thus, when an AC degaussing field above about 200 Oe is applied, the layer 26 becomes sufficiently demagnetized to allow the magnetic material layer 24 to generate a harmonic signal thereby once again rendering the device 10 detectable.

Figure 1A:
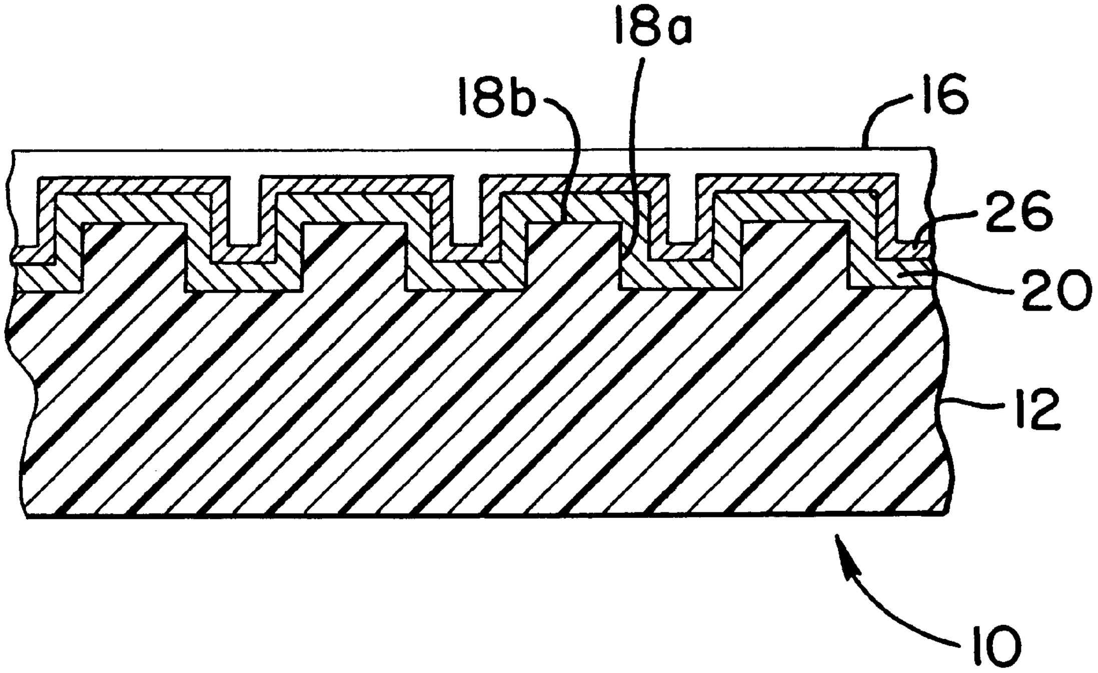
FIG. 1A shows a fragmentary cross-sectional view of a modified version of the disc-like device of FIG. 1.

Of course, the deactivatable layer 26 could also be applied to the structure of FIG. 1 where the magnetic layer 20 serves as both the reflective layer as well as the EAS magnetic active component. This is shown in FIG. 1A.

Where a double sided CD is used, FIGS. 1 to 3 may be constructed or laminated back to back to provide the ability to read both sides of the CD and provide EAS protection as well as deactivation and reactivation capability.

Figure 4:
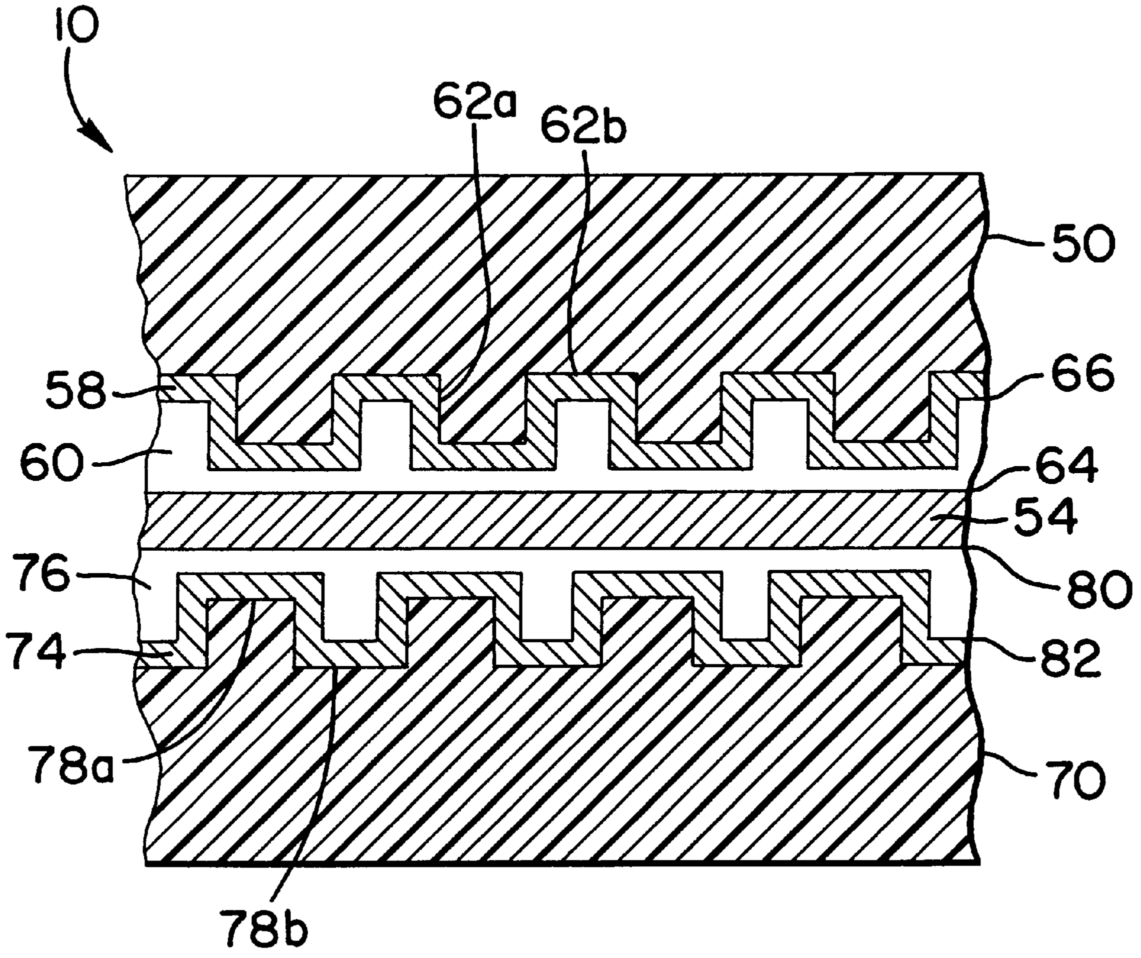
FIG. 4 shows a fragmentary cross-sectional view of another modified embodiment of the disc-like device of the present invention.

Another modified embodiment of the double sided CD device 10 is illustrated in FIG. 4, with a first dis-like substrate 50 and a second disc-like substrate 70 having a magnetic layer 54 sandwiched between protective layers 60 and 76, respectively, of the two substrates. More particularly, the protective layer 60, with first top and bottom surfaces 64 and 66, and the protective layer 76 with second top and bottom surfaces 80 and 82 enclose the magnetic layer 54 between the first top surface 64 of the layer 60 and the second top surface 80 of the layer 76.

Similar to the other embodiments, the device 10 has its first substrate 50 with a first signal pattern of pits 62*a* and lands 62*b* and a reflective layer 58 and its second substrate 70 with a second signal pattern of pits 78*a* and lands 78*b* and a reflective layer 74. Thus the device 10 of FIG. 4 permits information to be stored and read from two combined substrates while also providing detection of the device by an EAS detection system. Deactivation and reactivation of the FIG. 4 device may also be provided by including a semi-hard layer of magnetic material adjacent the soft magnetic layer 54.

The magnetic layers 20, 22, 24 and 54 of the device 10 as illustrated in FIGS. 1–4 can comprise an EAS material which can either be a non-magnetostrictive or magnetostrictive material.

Examples of non-magnetostrictive materials which can be used for the magnetic material layer are any number of soft amorphous magnetic materials. For example, amorphous transition metal-metalloid compositions containing Co, Fe, Si and B with an atomic ratio of Co to Fe of 94:6 can be used. Examples of such compositions include $Co_{74.26}Fe_{4.74}Si_{2.1}B_{18.9}$ and $Co_{70.5}Fe_{4.5}Si_{15}B_{10}$.

Other materials which may be used include a low magnetostrictive CoNiFeB based amorphous material composition such as $Co_{56}Ni_{16}Fe_{8}B_{20}$ and $Co_{44}Ni_{24}Fe_{12}B_{20}$.

Other materials which may be used are amorphous transition metal-metal compositions selected from the group comprising Co, Zr and Nb such as $Co_{90}Zr_{5}Nb_{5}$.

Crystalline material having a NiFe composition such as $Ni_{81}Fe_{19}$may also be used for the magnetic layer.

Magnetostrictive materials which can be used as the magnetic material layer include amorphous materials comprising compositions containing Co, Fe, Si and B with examples including $Co_{39.5}Fe_{39.5}Si_{2.1}B_{18.9}$ and $Co_{47.4}Fe_{31.6}Si_{2.1}B_{18.9}$.

Other examples include compositions containing Co, Fe, Ni and B such as $Co_{20}Fe_{40}Ni_{20}B_{20}$ and $Co_{10}Fe_{60}Ni_{10}B_{20}$.

Further magnetic materials can be selected from compositions including Co, Zr and Nb with an example being $Co_{90}Zr_{10}$.

Magnetostrictive material of a crystalline material may also be used with compositions selected from the group comprising Ni and Fe. An example includes $Ni_{45}Fe_{55}$.

With respect to the magnetostrictive materials, stress relief annealing may be required to enable the material to respond to a field. The temperature range and time for annealing is dependent upon the type of magnetostrictive material being used, its desired thickness and the temperature range of the other materials comprising the disc-like device (e.g., the type of plastic substrate, the type of material in the reflective material layer, etc.).

For the semi-hard material layer 26, semi-hard material compositions similar to those sold under the trademarks "Vicalloy" or "Crovac" and available commercially from Vacuumschmelze GmbH of Hanau, Germany, may be used. Examples of such compositions include $Co_{80}Ni_{20}$ and $Co_{48}Fe_{41}V_{11}$. The layer 26 can have a thickness in the range of about 0.5 microns to 25 microns and a coercivity above about 20 Oe and below about 500 Oe.

Figure 5A:
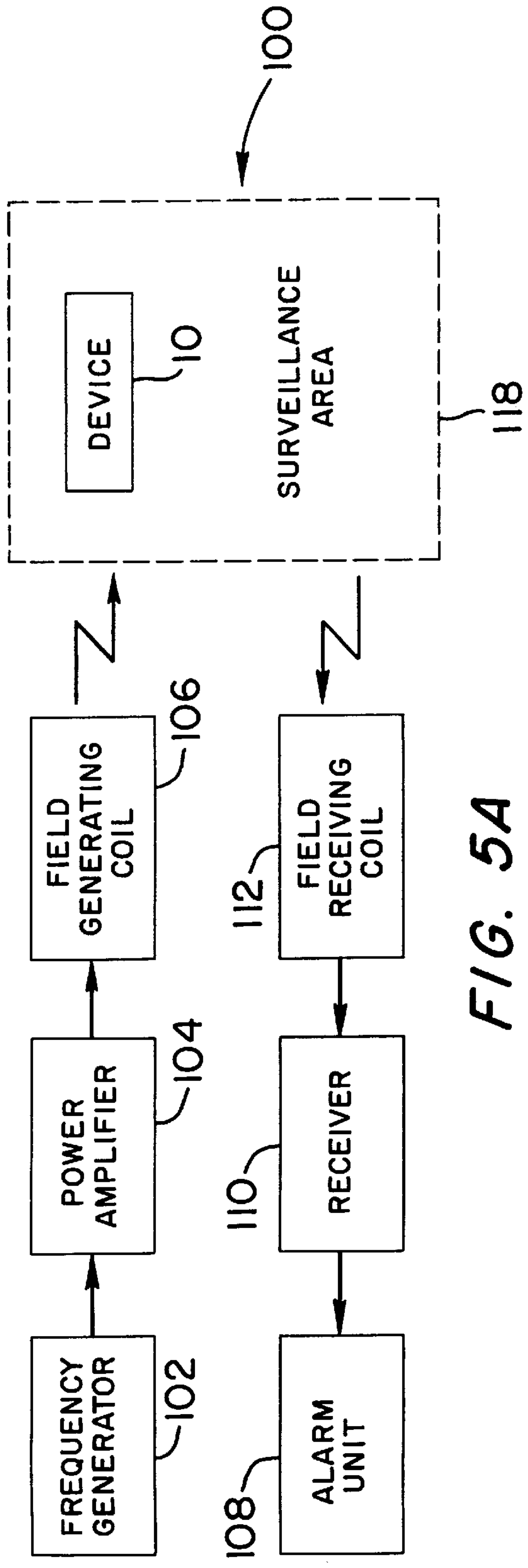
FIGS. 5A and 5B show an EAS detection system and activation/deactivation system for use with the disc-like device of the present invention.

The device 10 as illustrated in FIGS. 1–4, can be used in an EAS detection system 100, as illustrated in FIG. 5A, which detects the presence of the device 10 in a particular surveillance area 118, e.g., an exit area of a retail establishment, as indicated by broken lines.

The transmitter portion of the system 100 comprises a frequency generator 102 with an output being fed to a power amplifier 104 which in turn feeds a field generating coil 106. The coil 106 establishes an alternating magnetic field of a desired frequency in the surveillance area 118. The amplitude of the field varies depending upon the system parameters, such as the type of coil, the size of the surveillance area 118, etc. The amplitude, however, must exceed a minimum field so that the device 10 in the surveillance area 118 will detect a field above the device threshold.

The receiving portion of the system 100 includes a field receiving coil 112, the output of which is applied to a receiver 110. When the receiver 110 detects a particular harmonic content in signals received from the coil 112 in a prescribed range and resulting from the device 10, the receiver 110 furnishes a triggering alarm to an alarm unit 108. The unit 108 activates an alarm to indicate that unauthorized removal of the device 10 is being attempted through the surveillance area 118.

Figure 5B:
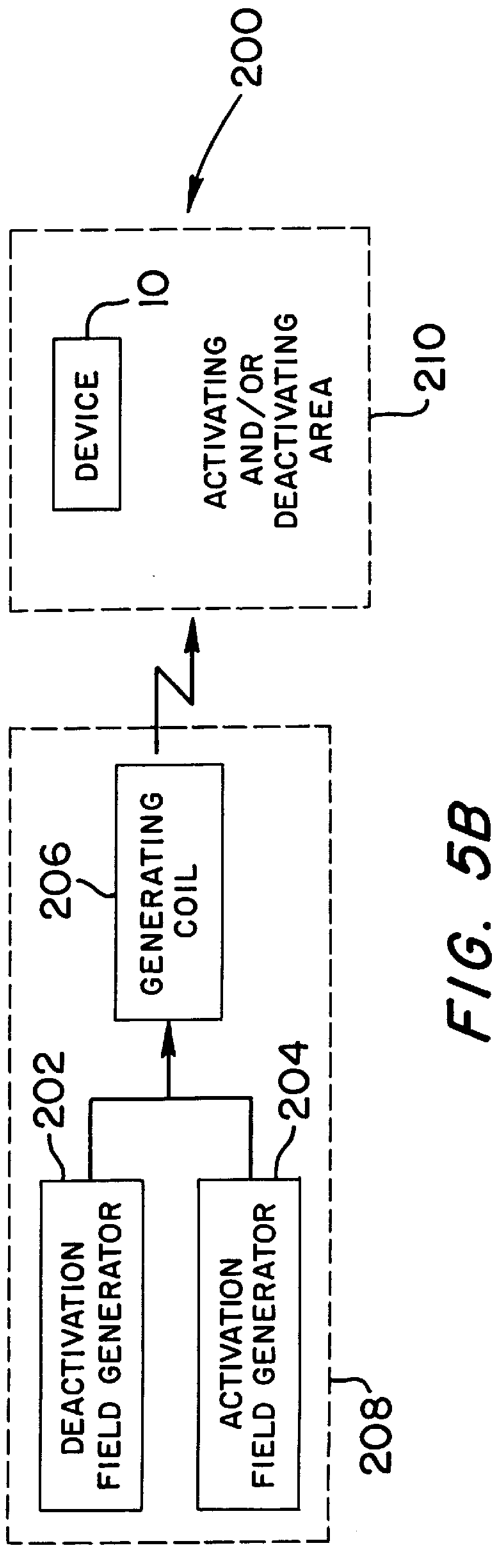

In addition, the device 10 as illustrated in FIG. 3 also has the ability to be detectable and non-detectable by the EAS detection system 100 by means of an activating/deactivating system 200. As illustrated in FIG. 5B, an activating and/or deactivating area 210 is established by an activating/deactivating unit 208. To render the device 10 non-detectable, the deactivation field generator 202 drives a generating coil 206 which establishes a pulsed or DC magnetizing field through the area 210. The initial amplitude of the pulsed or DC magnetizing field must exceed a minimum level so that the device 10 in the area will be exposed to a magnetizing field of a sufficient level to magnetize the semi-hard material layer 26 of the device 10 to render the device 10 non-detectable. During the deactivation process, the activation field generator 204 is inactive.

The device 10 as illustrated in FIG. 3 can then also be rendered detectable by the EAS detection system 100. An activation field generator 204 drives the generating coil 206 to establish an AC degaussing field through the area 210. The initial amplitude of the activation field must exceed a minimum level so that the device 10 in the area will be exposed to a decaying AC field of a sufficient level to demagnetize the semi-hard material layer 26 to render the device 10 detectable. During the activation process, the deactivation field generator 202 is inactive.

The device 10 as illustrated in FIG. 3, however, is not limited to the above deactivation and reactivation processes but can be activated, deactivated and reactivated in a variety of ways. For example, a multi-pole magnet can be used to alter the magnetic state of the semi-hard material layer 26.

As shown in the illustrated embodiments, the magnetic material layer as well as the semi-hard material layer extend over the surface of the disc-like device 10. However, these layers can extend over only selected areas of the disc-like substrate and can be formed in a variety of patterns or designs, such as strips, circles, etc.

Further, the device 10 and application of the layers thereof can also be made by any number of manufacturing processes. Particularly, a variety of different types of evaporation and sputtering methods can be used for applying a magnetic material layer to the disc-like device 10. For example, a planar type sputtering apparatus can be used. The sputtering method can also include a facing target cathode type, an ion-beam sputtering type, a laser-beam sputtering type or a magnetron sputtering apparatus.

The device 10 of the present invention can be any type and/or size CD, such as CD-ROM, audio CD, mini-CDs, CD-R, DVD, DVD-ROM, CD-I, etc. The disc-like device 10 of the present invention is also not limited to the present illustrative case, but can also include a phonograph record or any type of disc-shaped information medium.

In all cases it is understood that the abovedescribed arrangements are merely illustrative of the many possible specific embodiments which represent applications of the present invention. Numerous and varied other configurations, can be readily devised in accordance with the principles of the present invention without departing from the spirit and scope of the invention.

What is claimed is:

1. A disc device comprising:

a substrate formed of a light transmissive material and having an information signal pattern formed on a surface thereof;

a reflective magnetic material layer formed on the information signal pattern on the surface of said substrate; and a semi-hard material layer formed on said magnetic material layer, said semi-hard material layer activating and deactivating the magnetic material layer to allow for detection and non-detection, respectively, of the disc device by an electronic article surveillance detection system.

2. A device in accordance with claim 1, wherein said magnetic material layer comprises a non-magnetostrictive material.

3. A device in accordance with claim 2, wherein said device includes a protective layer of transparent resin formed on the semi-hard material layer.

4. A device in accordance with claim 1, wherein said magnetic material layer comprises a magnetostrictive material.

5. A device in accordance with claim 4, wherein said device includes a protective layer of transparent resin formed on the semi-hard material layer.

* * * * *